United States Patent
Santos (10) Patent No.: US 9,301,557 B1
(45) Date of Patent: Apr. 5, 2016

(54) HEAT PIPE MATERIAL AND GARMENT

(71) Applicant: Elmer Santos, Luanda (AO)

(72) Inventor: Elmer Santos, Luanda (AO)

( * ) Notice: Subject to any disclaimer, the term of this patent is extended or adjusted under 35 U.S.C. 154(b) by 0 days.

(21) Appl. No.: 14/567,040

(22) Filed: Dec. 11, 2014

(51) Int. Cl.
| | | |
|---|---|---|
| *B32B 3/10* | (2006.01) | |
| *A41D 13/005* | (2006.01) | |
| *F28D 15/04* | (2006.01) | |
| *B32B 3/14* | (2006.01) | |
| *B32B 3/18* | (2006.01) | |
| *B32B 5/02* | (2006.01) | |
| *B32B 25/10* | (2006.01) | |
| *F28D 15/02* | (2006.01) | |

(52) U.S. Cl.
CPC .............. *A41D 13/0053* (2013.01); *B32B 3/14* (2013.01); *B32B 3/18* (2013.01); *B32B 5/02* (2013.01); *B32B 25/10* (2013.01); *F28D 15/02* (2013.01); *F28D 15/046* (2013.01); *B32B 2571/00* (2013.01); *Y10T 428/139* (2015.01); *Y10T 428/1352* (2015.01); *Y10T 428/24463* (2015.01)

(58) Field of Classification Search
CPC .............. B32B 3/14; B32B 3/18; B32B 5/02; B32B 25/10; B32B 2571/00; F28D 15/02; Y10T 428/1352; Y10T 428/139; Y10T 428/24463
USPC ........................................................ 442/362
See application file for complete search history.

(56) References Cited

U.S. PATENT DOCUMENTS

| | | | |
|---|---|---|---|
| 4,279,294 A | 7/1981 | Fitzpatrick | |
| 5,201,365 A | 4/1993 | Siegel | |
| 5,386,701 A | 2/1995 | Cao | |
| 6,109,338 A | 8/2000 | Butzer | |
| 2010/0107657 A1* | 5/2010 | Vistakula | 62/3.5 |
| 2012/0260410 A1* | 10/2012 | Berglund et al. | 2/458 |
| 2013/0025315 A1* | 1/2013 | Freeman et al. | 62/259.3 |

FOREIGN PATENT DOCUMENTS

WO    2014140098 A1    9/2014

OTHER PUBLICATIONS

The Chemistry of Textile Fibres, Mather et al, 2011, pp. 1-3.*

* cited by examiner

*Primary Examiner* — Elizabeth M Cole
(74) *Attorney, Agent, or Firm* — Gearhart Law LLC (57) ABSTRACT

A heat pipe material suitable for making wearable garments is disclosed. The material has a sandwich structure including a conduction layer, a separation layer, a wick layer and an insulating layer. The conduction layer is made of discs of a rigid, thermal conducting material connected by a flexible, impermeable material. The separation layer is flexible, porous to gas and maintains a separation between the outer layers. The wick layer transfers a working fluid by capillary action. The insulating layer is the outer skin of the garment made from the heat pipe material and is flexible, impermeable to air and has a low thermal conductance. To create a functioning heat pipe, the material is sealed about its periphery and contains a working fluid. A thermal source is functionally connected to the working fluid. The heat pipe garment help maintains a wearer's body temperature close to 37 degrees Celsius.

14 Claims, 5 Drawing Sheets

HEAT PIPE MATERIAL AND GARMENT

CROSS-REFERENCE TO RELATED APPLICATIONS

This application claims no priority to any other relevant patent literature.

BACKGROUND OF THE APPLICATION

1. Field of the Application

This disclosure relates to a material for transferring heat, and more particularly to a flexible heat pipe material used to fabricate wearable heat pipe garments and other flexible heat pipe devices.

2. Background

Maintaining normal body temperature is of great importance to mammals, including human beings, both for comfort and to maintain natural body functionality. Clothing is one approach to assist the body in maintaining its optimum temperature range. Traditional clothing has, however, relied primarily on the thermal conductance—or lack thereof—of the materials used to fabricate the garments to achieve this assistance.

Another, more recent approach, has been to create more active garments in which heat is transferred to or away from the body by specially designed structures including, but not limited to, heat pipes.

Traditional heat pipes are rigid tubes and have interiors that are typically at a reduced pressure compared to the surrounding atmosphere. Wearable garments require a certain degree of flexibility. Adapting heat pipe technology to function in a form that is flexible enough for comfortable, wearable garments therefore presents a number of problems, including, but not limited to, how to extract heat from a sufficiently large surface area while maintaining sufficient flexibility.

Nevertheless, several attempts have been made to adapt heat pipe and heat pipe related technology for use in wearable garments.

Description of Related Art Including Information Disclosed Under 37 CFR 1.97 and 1.98

The relevant prior art includes:

U.S. Pat. No. 6,109,338 issued to Butzer on Aug. 29, 2000 entitled "Article comprising a garment or other textile structure for use in controlling body temperature" that describes an article for use in cooling body temperature which comprises a garment having a coat and pant, with each having a body section adapted to receive a portion of the torso of the wearer and extensions from the body section to receive the wearer's limbs. The garment includes a system for circulating temperature controlling fluid from a suitable source through patches removably received in pockets in each of body section and extensions.

U.S. Pat. No. 5,386,701 issued to Cao on Feb. 7, 1995 entitled "Human body cooling suit with heat pipe transfer" that describes a new human body cooling suit that is comprised of a number of flexible heat pipes and a (or a number of) phase-change material (PCM) module (or modules). A lower section (with reference to the gravity field) of the flexible heat pipe is sandwiched between the outer cover and the inner lining materials. An upper section of the heat pipe runs through the PCM module. The shell of the flexible heat pipe can be a corrugated metal tube, a corrugated plastic tube, or a smooth plastic tube, depending on specific applications. The said outer cover is made of thermal insulating materials that shield off the heat from the environment to the human body. When a human being, who wears this cooling suit, is exposed to a very hot environment, the flexible heat pipe section embedded in the suit materials absorbs the heat that is dissipated from the human body, and transfers it to the said PCM module where the heat is stored in the PCM module via the change of phase. Since the PCM is chosen such that it has a melting temperature close to the normal temperature range of the human body and a large latent heat of melting, and the heat pipe has an extremely high effective thermal conductance, the human body temperature can be maintained at a temperature close to normal, regardless of the environment a person encounters. Three types of PCM modules, in which the thawed PCM can be easily replaced, are also described.

U.S. Pat. No. 4,279,294 issued to Fitzpatrick et al. on Jul. 21, 1981 entitled "Heat pipe bag system" that describes a method and apparatus for utilizing the earth as a heat source and heat sink for heating and cooling buildings are disclosed. Flexible material such as hollow plastic or metal foil bags which can be buried in deep, narrow trenches are draped over and clamped to heat transfer fluid conduits or conventional heat pipes vastly increasing the heat transfer surface area serving the conduits or heat pipes. The heat pipe bags contain a heat transfer fluid and can contain wicks which are in heat transfer communication with the heat transfer fluid conduits or other heat pipes. The plastic or metal of the heat pipe bag similarly encloses the wick forming a closed, sealed system which can also include the conduit or heat pipe. Such conduit-heat pipe bag combination can be used in combination with conventional heat pumps to both heat and cool buildings.

U.S. Pat. No. 5,201,365 issued to Siegel on Apr. 13, 1993 entitled "Wearable air conditioners" that describes a cooling system that can be worn and travel with the person using the cooling system. Flexible inter-communicating containers (such as coils), are adapted to fit body contour and function as heat removers. The containers are incorporated into clothing, or applied directly to the body. Water under a vacuum in the containers boils at low temperature and removes body heat. Vapor generated by the boiling water re-condenses into water in a communicating portable cold container, which is cooled by portable ice packs, or by endothermic chemical reactants. The degree of cooling can be controlled by regulation of the degree of the communication between the heat remover containers and the cold condenser container. The re-condensed water returns spontaneously to the heat remover containers by force of gravity. The cooling device can be incorporated into any object which forms a direct or an indirect contact with a person using the device, such as medical casts, and cold compresses.

BRIEF SUMMARY

A flexible, heat pipe material that may be made flat and be suitable for making wearable garments, and the heat pipe garments made thereof, are disclosed.

In one embodiment, the flexible, heat pipe material may be a sandwich structure having a conduction layer, a separation layer, a wick layer and an insulating layer.

The conduction layer may be flexible and impermeable to air. This layer is intended to be closest to a garment wearer's body and may act as a conduit for heat to or from the body to a working fluid within the heat pipe material. The conduction layer may, for instance, have regions made of a rigid, high thermal conductance material, such as, but not limited to, a metal. These rigid regions, that may be disc shaped, may be connected by a flexible material that is impermeable to air such as, but not limited to, butyl rubber.

The separation layer is may be a structure that may be flexible and porous to gases. It is intended to internally separate the outer layers of the heat pipe material and may be able to maintain a low internal pressure and resist being compressed by atmospheric pressure action on the outer layers of the material. One suitable material for the separation layer may be a number of springs.

The wick layer may be structured to be flexible and to transfer a fluid by capillary action. For applications in which heat may be transferred to the garment wearer, the single wick layer may be located between the separation layer and the insulating layer. For applications in which heat is being transferred away from the garment wearer, the single wick layer may be located between the conduction layer and the separation layer.

The insulating layer may be the outer skin of a heat pipe garment made from the heat pipe material. The insulating layer may, therefore, be flexible, impermeable to air and have a low thermal conductance. One material suitable for the insulating layer may be butyl rubber.

In a further embodiment, there may be a second wick layer, so that the separation layer may be sandwiched between the two wick layers.

In order to transform such a flexible heat pipe material into a functioning flexible, flat heat pipe an area of the material may need to be sealed about its periphery to provide an air tight enclosure. That enclosure may then need to contain a working fluid that may be in a saturated state. A thermal source may then be functionally connected to the working fluid within the enclosure, thereby creating the elements of a functioning heat pipe.

In one embodiment, a heat pipe garment may maintain, or help maintain, a body temperature in a range of 37+/−10 degrees Celsius, and maybe even to within a range of 37+/−1 degrees Celsius.

In order to do this, the working fluid may transition from a liquid to a vapor state at a temperature that may be within this required working range. A suitable working fluid for this application may include fluids such as, but not limited to, alcohol, water, acetone or ammonia, or a combination thereof.

These fluids may operate at atmospheric pressure but may be in an enclosure that may have an internal pressure that is less than atmospheric pressure and which may be as low as 80% of atmospheric pressure or less.

In one embodiment, the heat source or sink that may either remove or supply heat to a garment wearer's body may be contained in an insulated pouch that may be functionally connected to the working fluid of the heat sink garment. This functional connection may, for instance, be provided by a structure such as, but not limited to, a conductive plate, one or more suitably insulated heat pipe tubes or some combination thereof.

ADVANTAGES

Therefore, the present application succeeds in conferring the following, and others not mentioned, desirable and useful benefits and advantages, including providing:

a simple material suitable for use in body temperature stabilization garments that are efficient and comfortable to wear;

a material suitable for use in body temperature stabilization garments that are washable and do not pose a risk of electrocution when worn;

a material that may transfer heat to or from a large enough area to be useful in garment; and reduce the dissipation of heat to a cool environment and the reception of heat from a warm one;

a material suitable for use in body temperature stabilization garments that may be a snug, comfortable fit, comfort while allowing normal, breathing activity.

DETAILED DESCRIPTION

The embodiments will now be described with reference to the drawings. Identical elements in the various figures are identified with the same reference numerals.

Various embodiments are described in detail. Such embodiments are provided by way of explanation, and are not intended to be limiting. In fact, those of ordinary skill in the art may appreciate upon reading the present specification and viewing the present drawings that various modifications and variations can be made thereto.

Figure 1:
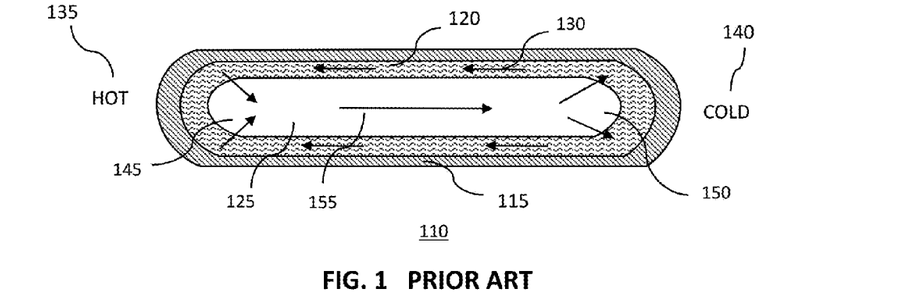
FIG. 1 shows a transverse cross-sectional view of a functional heat pipe.

FIG. 1 shows a transverse cross-sectional view, representative of a functional heat pipe 110.

A conventional heat pipe 110 is a heat transfer device with an extremely high effective thermal conductivity. Heat may be transferred from a region that is hot 135 to a region that is cold 140 either for the purposes of cooling the hot region or for heating the cool region.

A conventional heat pipe 110 may be an evacuated vessel having an impervious outer casing 115, a porous material 120 lining the inside of the outer casing and a hollow inner region 125. The impervious outer casing 115 is typically made of metal and is typically circular in cross section. The conventional heat pipe 110 typically contains a small quantity of working fluid. A conventional heat pipe 110 may be a totally passive system, having no moving parts, and may transfer heat from a heat source to a heat sink over a minimal temperature gradient.

As shown in FIG. 1, a conventional heat pipe 110 operates via the evaporation and condensation of the working fluid. At the region that is hot 135, heat flows across the impervious outer casing 115 into region 145 where liquid working fluid vaporizes into a gas state. This causes heat to be absorbed as the latent heat of evaporation of the working fluid. As the working fluid vaporizes it may also create a pressure gradient in the heat pipe. This may force the working fluid to travel 155 in a gas form from the hotter region to a region in thermal contact with a region that is cold 140.

When the gaseous working fluid reaches the region 150 the working fluid may condense into a liquid and may release its latent heat of vaporization. The working fluid may then return to the a region that is in thermal contact with the region that is hot 135 via the porous material 120 with the fluid moving 130 by capillary action.

Efficient heat pipes typically use a working fluid having thermal properties, particularly the temperature at which the working fluid transitions from a liquid to a gas, selected for the heat transfer task they are designed to perform. The selected boiling point of the working fluid allows it to make use of the latent heat of evaporation and/or of the latent heat of fusion, as well as the process of capillary action.

Figure 2:
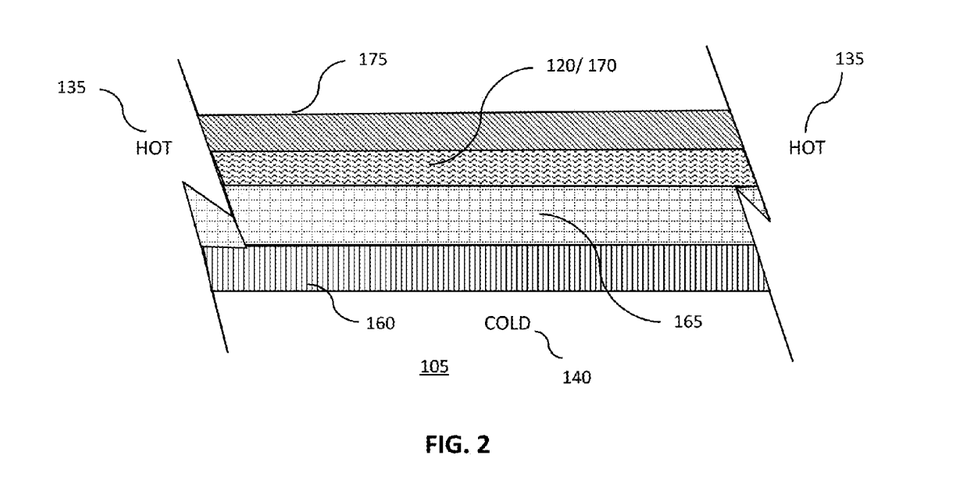
FIG. 2 shows a schematic cross-sectional view of a heat pipe material that may be suitable for use in a garment.

FIG. 2 shows a schematic cross-sectional view of a flexible heat pipe material that may be suitable for use in a garment.

The flexible heat pipe material 105 may be a sandwich construction having a conduction layer 160, a separation layer 165, a wick layer 170 and an insulating layer 175.

In one embodiment of the flexible heat pipe material 105 the conduction layer 160 may be flexible and impermeable to air, while the separation layer 165 may be structured to be flexible and porous to gases, the wick layer 170 may be a porous material 120 structured to be flexible and to transfer a fluid by capillary action, and the insulating layer may be flexible, impermeable to air and have a low thermal conductance.

For applications in which heat may be transferred to the garment wearer, the single wick layer may be located between the insulating layer and the separation layer, as shown in FIG. 2. For applications in which heat is being transferred away from the garment wearer, the single wick layer may be located between the conduction layer and the separation layer (Not shown).

In a further embodiment there may be a second wick layer, with wick layers located on either side of the separation layer.

The separation layer 165 may be necessary because as the impervious outer casing 115, the porous material 120 and the conduction layer 160 are all flexible, if the pressure inside the layers is less than atmospheric pressure, the material may collapse in on itself, which may prevent the gaseous working fluid flowing from the region that is hot 135 to the region that is cold 140.

Figure 3:
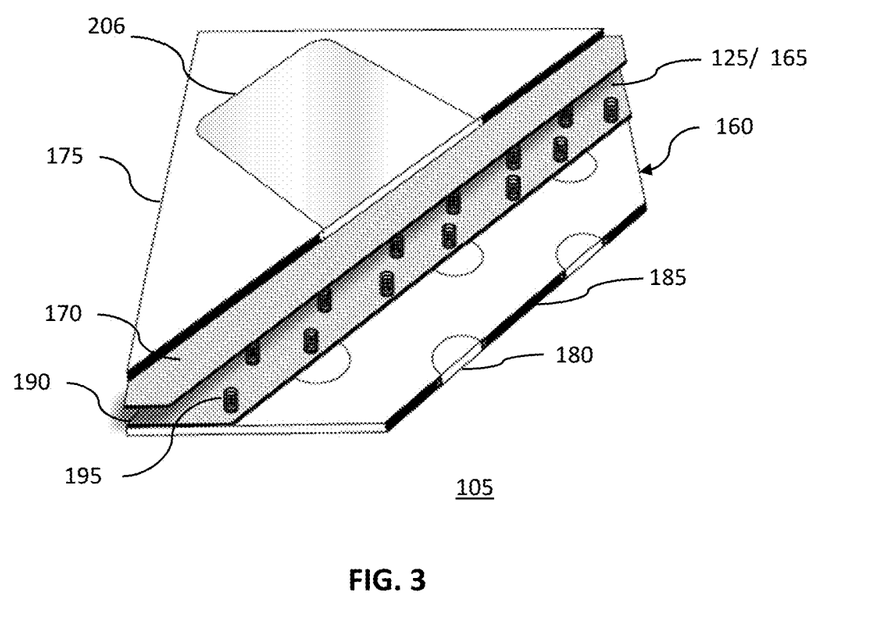
FIG. 3 shows a schematic, isometric cross-sectional view of a heat pipe material that may be suitable for use in a garment.

FIG. 3 shows a schematic, isometric cross-sectional view of a heat pipe material that may be suitable for use in a garment.

In addition to the insulating layer 175, the wick layer 170, the hollow inner region 125 or separation layer 165, the second wick layer 190 and the conduction layer 160, the embodiment shown in FIG. 3 also includes a thermal source contact 206.

This thermal source contact 206 may be a region of thermally conductive material in an otherwise insulating layer 175. The thermal source contact 206 may, for instance, be a rigid or flexible plate made of a thermally conductive material such as, but not limited to, bronze, brass, iron, copper, aluminium, graphite, stainless steel, titanium or some combination or alloy thereof.

The remainder of the insulating layer 175 may, for instance, be made of a suitably flexible, impervious to air and insulating material that may be a natural rubber, a suitable elastomer or a synthetic rubber such as, but not limited to, butyl rubber, neoprene, or an elastane, also known as Spandex™, or some combination thereof.

In the embodiment shown in FIG. 3, the separation layer 165 is shown as a plurality of coiled compression springs 195 placed perpendicular to the other layers and in which there are spaces between successive coils. Such coils may resist being compressed when a force is applied perpendicular to their axis. One of ordinary skill in the art will, however, appreciate that different spring configurations may also be used to effect a similar function.

In alternate embodiments, the separation layer 165 may be flexible structures such as, but not limited to, any metal or plastic flexible spacer structures that may be printed using 3D printers; any sufficiently porous yet firm, flexible foams made of metal, plastic or other suitable material; metal or plastic springs or spring like structures; metal or plastic mesh structures, or some combination thereof.

The wick layer 170 and the second wick layer 190 may, for instance, be made of a suitably porous material capable of capillary transportation of the selected working fluid such as, but not limited to, a suitably sized wire mesh; a twill fabric woven in cotton, silk, linin, wool, metal fiber or plastic fiber; a felt, a plastic; a plastic or metal foam; a sintered powder plastic or metal structure, a grooved plastic or metal substrate; a suitably sized and oriented open annulus or plurality of cylinders; an open or an integral artery, or some combination thereof.

The conduction layer 160 may be made of a combination of a number of separated regions 180 of high thermal conductance material joined by a flexible material 185 that is impermeable to air.

In one embodiment, the conductive parts 180, may be made of a conductive material such as, but not limited to, bronze, brass, iron, copper, aluminum, graphite, stainless steel, titanium or some combination or alloy thereof. They may be a flat, circular shape, with 2-4 cm of diameter and 1-4 mm thick. One of ordinary skill in the art will, however, appreciate that different forms, shapes, dimensions and materials may also be used. The flexible, elastic material 185 that is impermeable to air may be butyl rubber, but a suitable elastomer or a synthetic rubber such as, but not limited to, natural rubber, a neoprene, or an elastane also known as Spandex™, or some combination thereof, may also be suitable.

Figure 4:
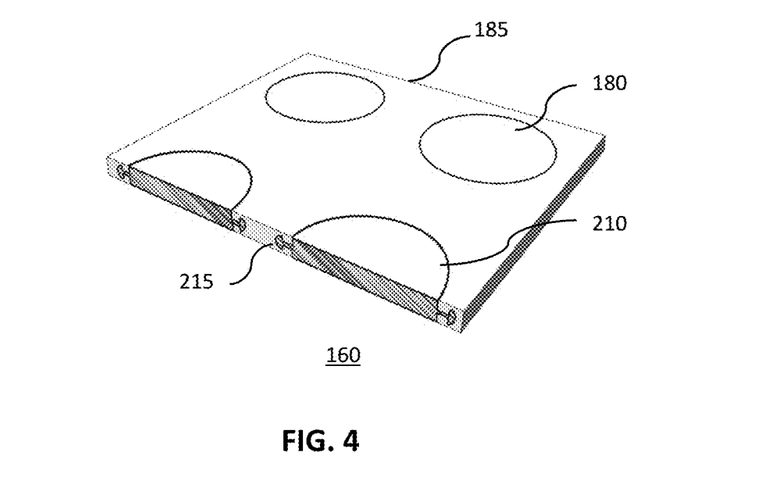
FIG. 4 shows a schematic, isometric sectional view of a conduction layer.

FIG. 4 shows a schematic, isometric sectional view of a conduction layer of one embodiment.

As shown in FIG. 4, the conduction layer 160 may be made of a number of separated regions 180 of a rigid, high thermal conductance material. These may be joined by a flexible material 185 that is impermeable to air, as described in more detail above. As seen in the conduction region 210 shown in cross-section, the region may have a sealing flange or appendage 215 that may be inserted into a circular, horizontal slot in the flexible material 185.

In a one embodiment, the discs with their appendages may be placed on a horizontal tray and then immersed in molten butyl rubber. When the rubber solidifies, the discs may then be attached to and sealed by the rubber. A similar technique may also be accomplished using other materials having suitable characteristics for use as a flexible layer such as, but not limited to, natural rubber, a neoprene, or an elastane also known as Spandex™, or some combination thereof.

In a further embodiment, the sealing flange or appendage 215 may be made of the same material as conductive parts 180 and they may be joined together via a technique such as, but not limited to, soldering, welding, or a suitable adhesive. The appendage 215 may be completely covered by the flexible, elastic material 185, which may provide a mechanical bonding between them. In such an embodiment, the mechanical bonding between the elastic material and the conductive plates may be complemented by chemical bonding. Such chemical bonding may, for instance, be accomplished using a water-based bonding adhesive that may cover the sides of conductive plates 180 and the entire surface of appendages 215. One of ordinary skill in the art will appreciate that there may be many variations of the shape of the appendages that may, for instance, include holes for extra attachment, and alternative chemical bonding agents such as, but not limited to, solvent-based bonding adhesives. The appendage material may also differ from that of the conductive parts 180 so as to, for instance, improve the flexibility or porosity of the seal.

In one embodiment, on the side of the conduction layer 160 that may be closest to the body of a wearer of a heat pipe garment, the surface of the regions 180 of high thermal conductance material may be flush with the surface of the flexible material 185 so that there may be a good contact between the conductive parts and the body.

The sealing flange or appendage 215 may, for instance, be mushroom shaped in cross-section and may be attached to the flexible material 185 so as to provide a flexible air tight seal.

In a further embodiment the separated regions 180 of rigid, high thermal conductance material may be constructed using a 3D printer and may be joined by springs of the same material. The resultant flexible metal mesh may then be dip coated with a suitable flexible polymer such as, but not limited to, butyl rubber, a latex rubber or some combination thereof, to provide a flexible conduction layer 160.

Figure 5:
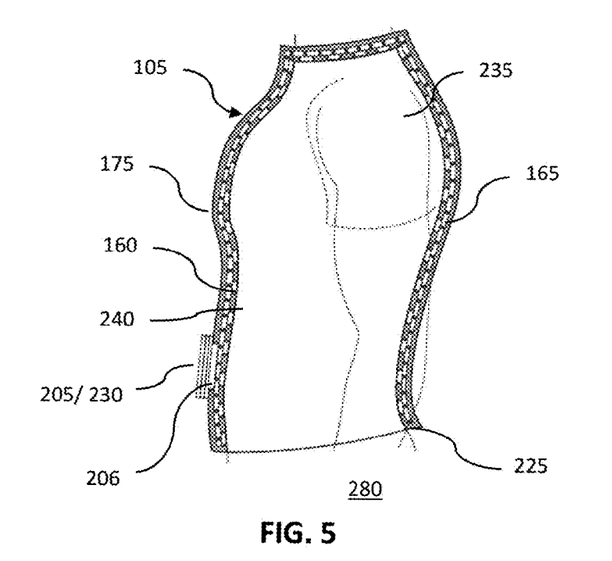
FIG. 5 shows a schematic, cross sectional view of a garment made of the heat pipe material.

FIG. 5 shows a schematic, cross sectional view of a garment made of the heat pipe material.

The heat pipe garment 280 may, for instance, be made of the flexible heat pipe material 105 described above. This material may have an insulating layer 175, a separation layer 165, a conduction layer 160 that may be on the heat pipe garment surface closest to the garment wearer's skin 240 and one or more wick layers (not shown in FIG. 5). These layers may then have a peripheral seal 225 so as to create an enclosed volume that may be filled with a suitable working fluid.

The heat pipe garment 280 may also have a thermal source or sink 205 that may be in an insulated pouch 230 that may be attached to the heat pipe garment 280 via a suitable thermal source contact.

The heat pipe garment 280 may also require a suitable working fluid to function to transfer the heat to either heat or cool the body as circumstances require.

In one embodiment, the heat garment may be used to maintain the body temperature of a human. An accepted range of human body temperature is 36.5-37.5° C. (97.7-99.5° F.). A heat pipe garment may, therefore, be designed to either heat or cool to this temperature range, or to within a range of 37+/−5° C. so as to assist the body in maintaining an optimal temperature. Even a temperature within a range of 37+/−10° C. may be sufficient for a heat pipe garment to help maintain, or provide, comfort to the wearer.

This may be achieved by using a working fluid that transitions from a liquid to a gas within this range of temperature. The transition temperature of a fluid to a liquid may also depend on the pressure of the fluid enclosure, with a lower pressure typically resulting in a lower transition temperature. Typical fluids that may, when the pressure is adjusted appropriately, vaporize or boil in the ranges mentioned above, including a range of 37+/−1° C., include substances such as, but not limited to, water; a ketone such as, but not limited to, acetone; ammonia and an alcohol such as, but not limited to, ethanol; or some combination thereof.

Typical internal pressures within the heat pipe enclosure may range from atmospheric to pressures below atmospheric pressure and may be partial vacuums that may be as low as 80% of atmospheric pressure or less.

One of ordinary skill in the art will, however, appreciate that garments made of the material intended for use by other animals such as, but not limited to, dogs or horses, may require maintaining, or helping maintain, a different temperature range, and that this may be accomplished using the same inventive principles disclosed in this application.

The working fluid may be in a saturated state within the heat pipe enclosure.

For transferring heat to the garment wearer 235, a thermal source 205 may include devices such as, but not limited to, a battery powered electrical heat pad; a hot water bottle; a disposable chemical pack that may function via a one-time exothermic reaction such as, but not limited to, the catalyzed rusting of iron or the dissolution of calcium chloride; a reusable chemical pack such as, but not limited to, one that operates via the crystallization of a supersaturated solution of sodium acetate that may be reconstituted by being placed in boiling water; by a pre-heated pad containing a material that has a high specific heat capacity such as, but not limited to, microwavable packs filled with grains such as, but not limited to, wheat, buckwheat or flax seed or some combination thereof; or by a pre-heated, phase change material having a high heat of fusion and an appropriate solid-liquid phase change temperature, such as, but not limited to, paraffin, docasyl bromide, caprylone, phenol, heptadecanone, cyclohexylooctadecane, heptadacanone, joluidine, cyanamide or methyl eicosanate, or some combination thereof.

Such heat providing sources may be inserted in an insulated pouch 230 which may allow it to be in contact with a thermal source contact 206, thus enabling the transfer of heat from the heat source to the heat pipe garment and hence to the garment wearer.

For cooling purposes, a pack capable of absorbing heat from its surroundings may be inserted into the insulated pouch 230. This may be a pre-cooled pad containing a material that has a high specific heat capacity such as, but not limited to, ice or ice made of water having organic salts or inorganic substance that lower the freezing point of the water. It may also or instead be an instant cold pack type device in which two liquids or a solid and a liquid are mixed to produce an endothermic chemical reaction. Such instant cold packs include combinations such as, but not limited to, water and a chemical compound such as, but not limited to, ammonium nitrate, calcium ammonium nitrate or urea or some combination thereof.

Such heat absorbing sources may be inserted in the insulated pouch 230 which may allow it to be in contact with a thermal source contact 206, thus enabling the transfer of heat from the heat pipe garment to the heat absorbing source. This in turn may enable heat to be transferred from the garment wearer to the heat pipe garment and hence to the heat absorbing source, which may result in reducing the temperature of the garment wearer.

Figure 6:
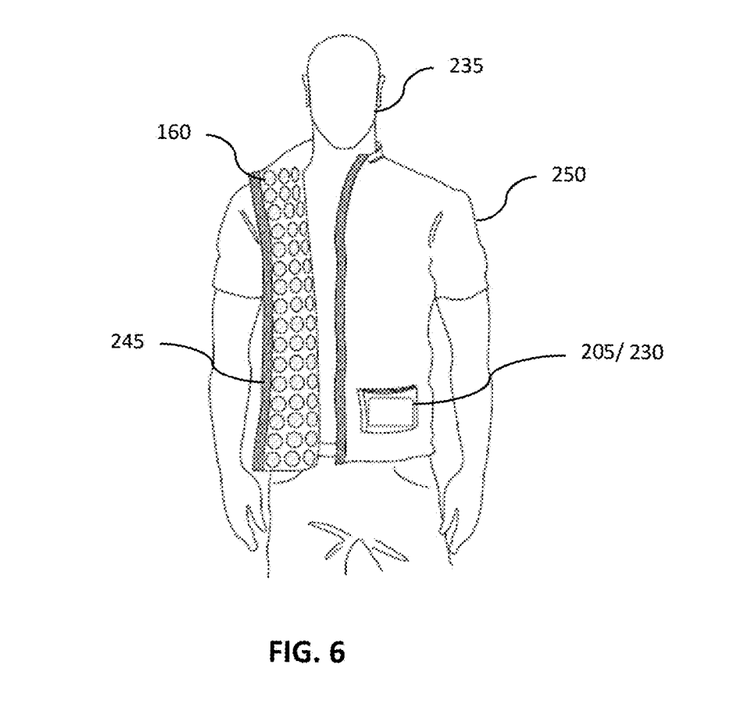
FIG. 6 shows a schematic, isometric view of a garment made of the heat pipe material being worn.

FIG. 6 shows a schematic, isometric view of a garment made of the heat pipe material being worn.

The garment 250 being worn by the garment wearer 235 may be made of a heat pipe material that may be of a type described above. The garment 250 may, for instance, have a conduction layer 160 that may be located adjacent to the skin or inner clothing of the wearer. The jacket 250 may be designed with an opening allowing it to be easily put on or taken off by the wearer. This opening may be closed by a suitable fastener 245. Such a fastener 245 may be a device such as, but not limited to, complementary strips of hook and loop fastener, a zipper fastener, one or more buttons and their corresponding button holes, a press-stud type fastener, or some combination thereof.

The garment 250 shown in FIG. 6 may also include an insulated pouch 230 that may contain a heating or cooling thermal source 205. The insulated pouch 230 may be an integral part of the jacket 250 and may be located on the outside as illustrated in FIG. 6 or on the inside of the jacket for added thermal insulation from the environment.

Figure 7:
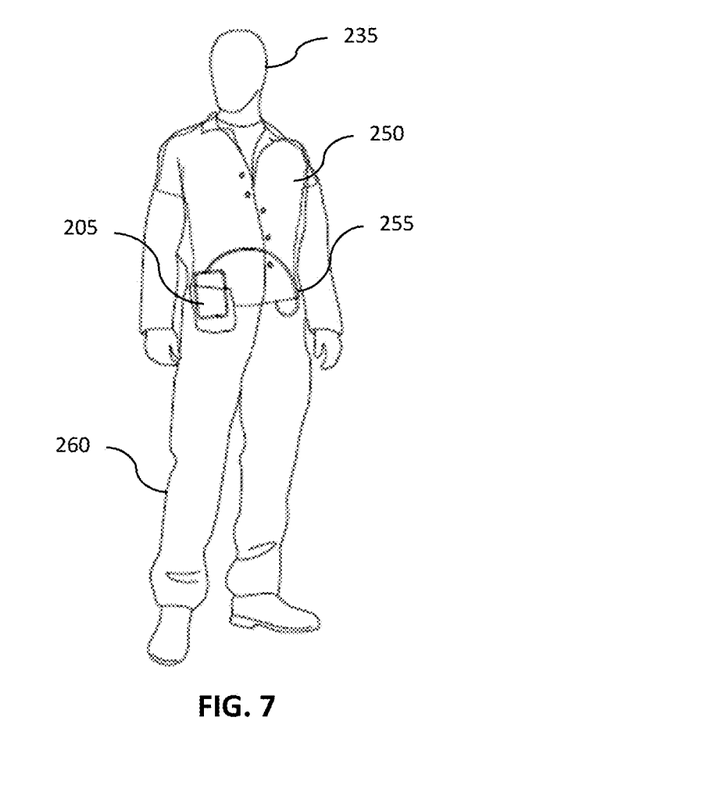
FIG. 7 shows a further schematic, isometric view of a garment made of the heat pipe material being worn.

FIG. 7 shows a further schematic, isometric view of a garment made of the heat pipe material being worn. The garment wearer 235 may be wearing a garment 250 made of flexible, heat pipe material under an overall 260.

In FIG. 7 the thermal source 205 is shown connected to the heat pipe garment by an insulated tube 255 illustrating how a heat pipe garment may be worn as underclothing, with the heat or cooling source easily housed in a remote pouch or pocket using the connecting tube.

This particular embodiment may be suitable for workers who must wear a protective overall for instance, as they could wear it under such overall.

One of ordinary skill in the art will appreciate that although the heat pipe garments illustrated in this application have been jacket like garments, the flexible, heat pipe material may be used to construct other garments and apparel such as, but not limited to, trousers, knee pads, elbow pads, shorts, bands, gloves, socks, hats, headgear, neckwear, patches, blankets or some combination thereof. Furthermore, the garments or apparel may be designed for other creatures such as, but not limited to, dogs or horses.

Furthermore, the flexible, heat pipe material may be combined with more common materials or textiles such as, but not limited to, woven cotton, woven linen, knitted wool, silk, nylon, polyester, or some combination thereof. This may, for instance, be done to provide extra comfort to the wearer, or to provide a more attractive color or look to the outside of the garment. The more common material may, for instance, be placed between the conduction layer and the garment wearer to increase comfort, or it may be placed on the insulating layer to provide an altered aesthetic to the garment.

Figure 8:
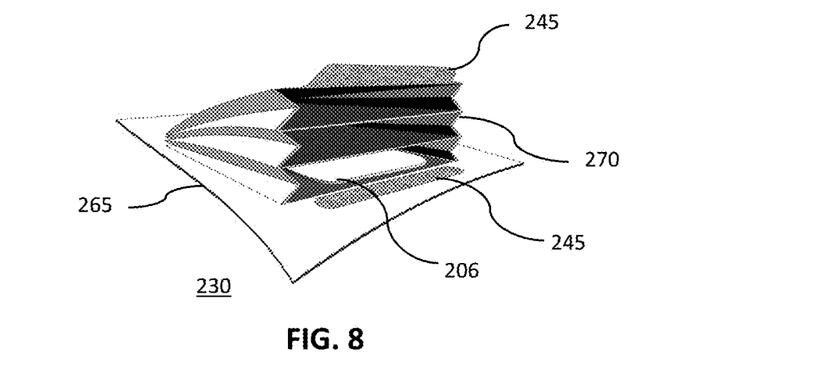
FIG. 8 shows a schematic, isometric view of an insulated pouch.

FIG. 8 shows a schematic, isometric view of an insulated pouch.

The insulated pouch 230 may have multiple compartments 270, each of which may contain a thermal source or sink (not shown in FIG. 8). The multiple compartments may allow the wearer to increase the heat flow to or from the garment by placing the heat source or sink (not shown in FIG. 8) in the compartments closer to the thermal source contact 206. Similarly, the heat flow to or from the garment may be reduced by placing the heat source of sink in the compartments further away from the thermal source contact. The insulated pouch 230 may be attached to the insulated layer of a portion of a garment 265 and may have a thermal source contact 206 to functionally connect the thermal source to the working fluid within the heat pipe garment.

The insulated pouch 230 may also have a closing mechanism or fastener 245 such as, but not limited to, hook and loop tape.

Figure 9:
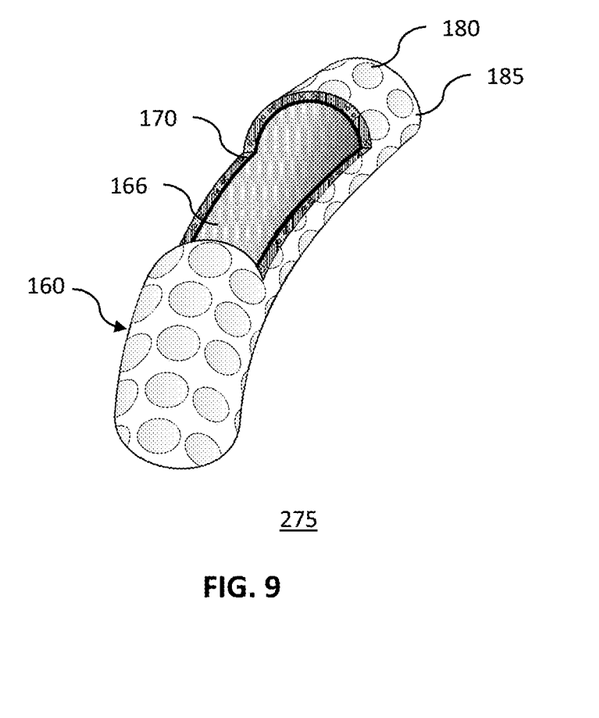
FIG. 9 shows a schematic, partial cut away, isometric view of part of a tubular, flexible heat pipe made of the heat pipe material.

FIG. 9 shows a schematic, partial cut away, isometric view of part of a tubular, flexible heat pipe made of the heat pipe material.

The tubular, flexible heat pipe 275 shown in FIG. 9 may be circular in cross-section and may consist only of a conduction layer 160 wrapped around a wick layer 170 that may be wrapped around an inner separation structure 166. The inner separation structure may be made in a fashion similar to the separation layer described above so that although it may be flexible and porous to gas, it may provide sufficient support to prevent the tubular, flexible heat pipe 275 collapsing in on itself under atmospheric pressure when the inner region of the heat pipe is at a reduced pressure compared to the pressure in a region surrounding the tubular, flexible heat pipe 275. The pressure in the surrounding region may, for instance, be atmospheric pressure, while the pressure within the heat pipe may be less than atmospheric pressure and may only be 80% of atmospheric pressure or less. The low internal pressure may, for instance, be the vapor pressure of the working fluid being used in the heat pipe.

Due to its flexibility and elasticity, the tubular, flexible heat pipe 275 may be attached to remote areas inside a piece of electronic equipment for example, and may adopt a shape adapted to the available space within the equipment. This adaptability may also allow one design of heat pipe to be easily mounted and dismounted in different shaped structures, avoiding the need to design a specific heat pipe for each piece of equipment in a range of equipment types. Having a single design for a range of equipment may reduce the cost of manufacture and may require fewer spare items to be stocked, thereby reducing the costs of maintaining equipment using the heat pipes.

Although this description has a certain degree of particularity, it is to be understood that the present disclosure has been made only by way of illustration and that numerous changes in the details of construction and arrangement of parts may be resorted to without departing from its spirit and scope.

What is claimed:
1. A flexible, heat pipe material, comprising:
  a conduction layer comprising:
    a plurality of flat, rigid, highly thermally conductive metal discs each of which is between 1 mm and 4 mm thick and wherein each of said discs have a radially protruding sealing appendage;
    a flexible, elastic material that is impermeable to air and has a plurality of through-holes matched in size and shape to said flat, rigid discs and wherein each of said through holes has a circular horizontal slot, said slots being matched in shape and size to receive said sealing appendage, and wherein said sealing appendages are inserted into said slots, thereby joining said discs and said flexible elastic material;
  a butyl rubber insulating layer, said insulating layer being flexible, impermeable to air and having a low thermal conductance;
  a separation layer comprising a plurality of metal or plastic springs and structured to be flexible and porous to gases, said separation layer being disposed between said conduction layer and said insulating layer;
  a first wick layer comprising a flexible material structured to transfer a fluid by capillary action and being located between said conduction layer and said separation layer thereby transferring heat away from said conduction layer; and
  a second wick layer, comprising a flexible material structured to transfer a fluid by capillary action and being located between said insulation layer and said separation layer thereby transferring heat towards said conduction layer.
2. A flexible, flat heat pipe comprising:
  an area of said material of claim 1, sealed about its periphery to provide an air tight enclosure, and containing a working fluid; and a thermal source or sink functionally connected to said working fluid contained within said area of sealed, flexible flat heat pipe material.

3. The flexible, flat heat pipe of claim 2 wherein said working fluid is selected from one an alcohol, a ketone, water or ammonia, or a combination thereof.

4. The flexible, flat heat pipe of claim 3 wherein said air tight enclose has an internal pressure that is lower than atmospheric pressure.

5. The flexible, flat heat pipe of claim 3 wherein said air tight enclose has an internal pressure that is 80% of atmospheric pressure or less.

6. The flexible, flat heat pipe of claim 4 wherein said working fluid transitions from a liquid to a vapor state at a temperature in a temperature range of 37+/−10 degrees Celsius.

7. The flexible, flat heat pipe of claim 4 wherein said working fluid transitions from a liquid to a vapor state at a temperature in a temperature range of 37+/−1 degrees Celsius.

8. A heat pipe garment comprising at least one region of said flexible, flat heat pipe of claim 2.

9. The heat pipe garment of claim 8 further comprising an insulated pouch in functional connection with said working fluid.

10. The heat pipe garment of claim 9 wherein said garment is fashioned to be a jacket having a front opening secured closed by one of a zipper fastener or a strip of hook and loop fastener material or some combination thereof.

11. The heat pipe garment of claim 9 wherein said insulated pouch is connected to said heat pipe material via an insulated tube.

12. The heat pipe garment of claim 8 is fashioned to be a pair of trousers.

13. The heat pipe garment of claim 8 further comprising a woven fabric attached adjacent to said conducting layer.

14. The heat pipe garment of claim 8 further comprising a woven fabric attached adjacent to said insulating layer.

\* \* \* \* \*